US008964123B2

(12) United States Patent
Nakashima (10) Patent No.: US 8,964,123 B2
(45) Date of Patent: Feb. 24, 2015

(54) AV DEVICE WITH BACKLIGHT BRIGHTNESS CONTROL

(71) Applicant: Funai Electric Co., Ltd., Daito, Osaka (JP)

(72) Inventor: Kazuki Nakashima, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 14/287,724

(22) Filed: May 27, 2014

(65) Prior Publication Data

US 2014/0354827 A1  Dec. 4, 2014

(30) Foreign Application Priority Data

May 29, 2013  (JP) .................. 2013-113161

(51) Int. Cl.

| H04N 9/64 | (2006.01) |
|---|---|
| G09G 3/36 | (2006.01) |
| H04N 5/57 | (2006.01) |
| H04N 17/04 | (2006.01) |
| H04N 7/088 | (2006.01) |
| H04N 5/60 | (2006.01) |
| H04N 5/63 | (2006.01) |

(52) U.S. Cl.
CPC .............. *H04N 5/57* (2013.01); *H04N 17/045* (2013.01); *H04N 7/0882* (2013.01); *H04N 5/60* (2013.01); *H04N 5/63* (2013.01)
USPC .......................................... 348/687; 345/102

(58) Field of Classification Search
USPC .......... 348/602, 687, 790, 558; 345/102, 690, 345/207, 697
See application file for complete search history.

(56) References Cited

U.S. PATENT DOCUMENTS

| 7,505,026 B2* | 3/2009 | Baba et al. .................... 345/102 |
|---|---|---|
| 2005/0017990 A1* | 1/2005 | Yoshida ........................ 345/690 |
| 2005/0231457 A1* | 10/2005 | Yamamoto et al. ........... 345/102 |
| 2006/0187158 A1* | 8/2006 | Wakabayashi et al. ......... 345/87 |
| 2008/0297662 A1* | 12/2008 | Gibbs ........................... 348/725 |
| 2009/0146941 A1* | 6/2009 | Fujine et al. .................. 345/102 |
| 2009/0268105 A1* | 10/2009 | Kohashikawa et al. ....... 348/790 |
| 2010/0295767 A1* | 11/2010 | Lee et al. ...................... 345/102 |
| 2010/0302237 A1* | 12/2010 | Aramaki ....................... 345/419 |

FOREIGN PATENT DOCUMENTS

JP  2002-351420 A  12/2002

* cited by examiner

*Primary Examiner* — Victor Kostak
(74) *Attorney, Agent, or Firm* — Global IP Counselors, LLP (57) ABSTRACT

An AV device includes a communication component, a determination component, and a controller. The communication component is configured to receive a signal outputted from a source device. The determination component is configured to determine whether or not the signal received by the communication component includes an audio signal and a subtitle signal, and a video signal included in the signal received by the communication component has a moving picture. The controller is configured to control a brightness of a backlight to be low in response to determining that the signal received by the communication component does not include both the audio signal and the subtitle signal, and that the video signal has the moving picture.

10 Claims, 6 Drawing Sheets

AV DEVICE WITH BACKLIGHT BRIGHTNESS CONTROL

CROSS-REFERENCE TO RELATED APPLICATIONS

This application claims priority to Japanese Patent Application No. 2013-113161 filed on May 29, 2013. The entire disclosure of Japanese Patent Application No. 2013-113161 is hereby incorporated herein by reference.

BACKGROUND

1. Field of the Invention

This invention generally relates to an AV device.

2. Background Information

The HDMI™ (high definition multimedia interface) standard is widely used today as a digital interface for connecting two or more electronic devices. Video signals, audio signals, and various kinds of control signals are sent in HDMI standard, by the TMDS (transition minimized differential signaling) method, from a source device to a sink device. TMDS allows the video signals, the audio signals, and various kinds of the control signals to be sent and received with a single cable.

However, when a television set or other such sink device is connected by HDMI to a DVD player or other such source device, a screen saver or other such video signal is outputted from the source device to the sink device. A screen saver is not something that the user generally watches by choice. However, since a television set receives the video signals, it will display this video (i.e., the screen saver). Thus, the duty ratio of a backlight of the sink device is kept high (i.e., at the same level as during normal video display), and this wastes power.

In view of this, a conventional display device determines whether or not an inputted video signal is a screen saver based on the ratio of the signal level that is lower than a reference signal level out of the video signal in a specific partial region (see Japanese Unexamined Patent Application Publication No. 2002-351420 (Patent Literature 1), for example). If it is a screen saver, then a brightness adjustment signal is sent such that the brightness will be adjusted to the level used for the screen saver, and the brightness of the backlight is lowered based on this signal.

SUMMARY

However, it has been discovered that with the display device in Patent Literature 1, when the inputted video signal is not a screen saver, but ordinary video with a low signal level (video that the user wants to watch), it is determined to be a screen saver and the brightness of the backlight is lowered.

One aspect is to provide an AV device that reduces power consumption by precisely determining video signals.

In view of the state of the known technology, an AV device is provided that includes a communication component, a determination component, and a controller. The communication component is configured to receive a signal outputted from a source device. The determination component is configured to determine whether or not the signal received by the communication component includes an audio signal and a subtitle signal, and a video signal included in the signal received by the communication component has a moving picture. The controller is configured to control a brightness of a backlight to be low in response to determining that the signal received by the communication component does not include both the audio signal and the subtitle signal, and that the video signal has the moving picture.

Also other objects, features, aspects and advantages of the present disclosure will become apparent to those skilled in the art from the following detailed description, which, taken in conjunction with the annexed drawings, discloses one embodiment of the AV device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Figure 1:
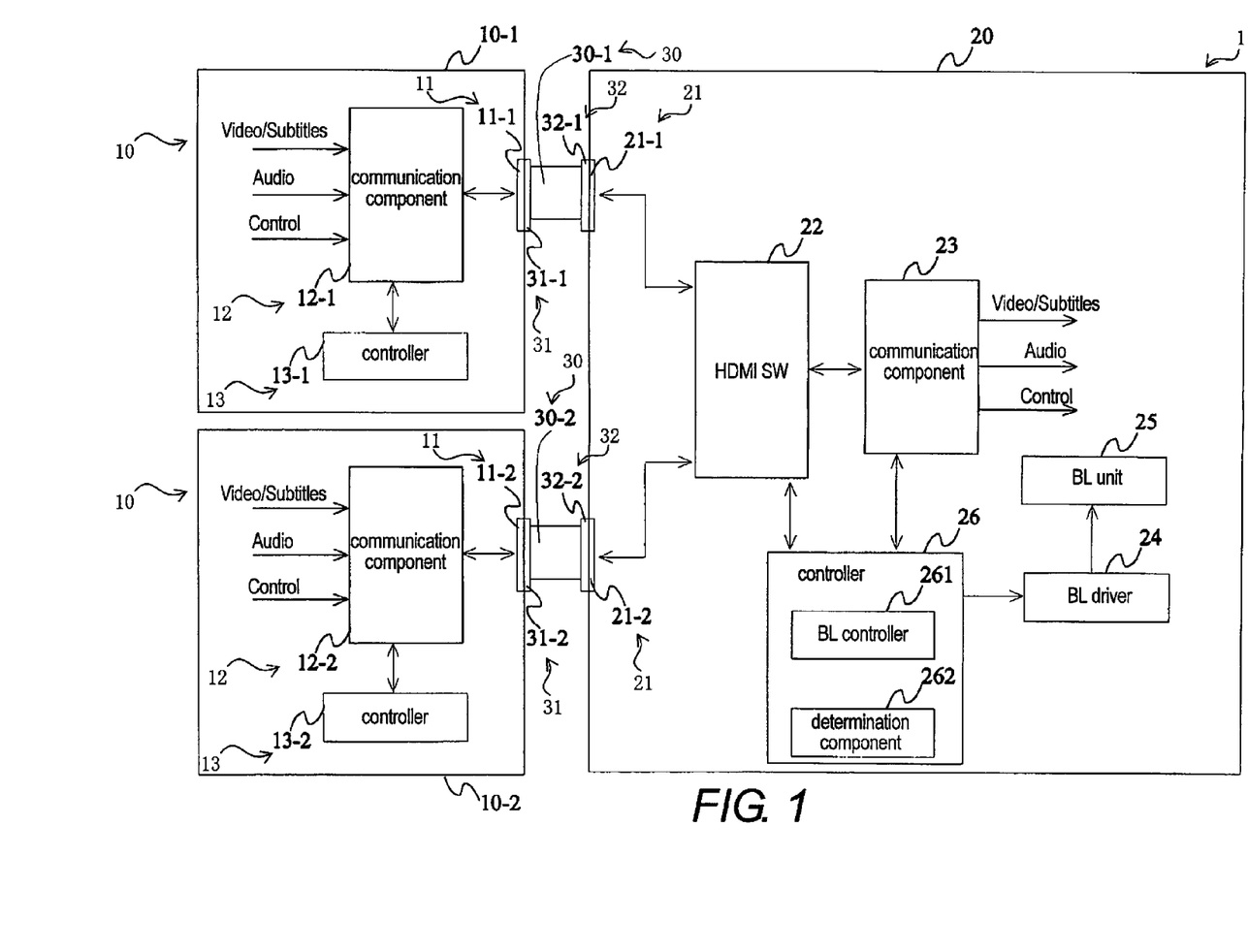
FIG. 1 illustrates a block diagram of an AV system in accordance with a first embodiment.

Referring initially to FIG. 1, an AV system 1 is illustrated that is equipped with a sink device 20 (e.g., an AV device) in accordance with a first embodiment. FIG. 1 illustrates a block diagram of the AV system 1. The AV system 1 includes a source device 10 that supplies AV (audiovisual) signals, the sink device 20 that receives the AV signals, and a cable 30 that conforms to the HDMI standard and connects the source device 10 to the sink device 20. The source device 10 is a BD/DVD player, a BD player, a digital camera, or the like, for example. The source device 10 can be any devices that supply the AV signals, as needed and/or desired. The sink device 20 is a television set, a projector, or the like, for example. The sink device 20 can be any devices that receives the AV signals, as needed and/or desired. There are also devices that combine the functions of a source device and a sink device, such as a television set with a built-in BD/DVD player, for example. In other words, in the illustrated embodiment, the source device 10 and the sink device 20 can be separate devices with separate housings or an integrated device with a single housing.

In this embodiment, two source devices 10 (10-1 and 10-2 in FIG. 1) are provided, each of which is connected to the sink device 20 by the cable 30 (30-1 and 30-2 in FIG. 1). There is no limit to the number of the source devices 10 that can be connected to the sink device 20. In the following description, when there is no need to distinguish between the source devices 10-1 and 10-2, and when there is no need to distinguish between the cables 30-1 and 30-2, they will be merely called the source devices 10 and the cables 30, respectively. Since the internal structures are the same in the source devices 10-1 and 10-2, the numbering of the internal structure will be handled similarly.

The source devices 10 and the sink device 20 includes receptacles 11 (11-1 and 11-2 in FIG. 1) and 21 (21-1 and 21-2 in FIG. 1), respectively. The receptacles 11 and 21 are respectively connected to plugs 31 (31-1 and 31-2 in FIG. 1) and 32 (32-1 and 32-2 in FIG. 1) that are provided to the ends of the cables 30 (30-1 and 30-2 in FIG. 1). Consequently, the source devices 10 and the sink device 20 are connected via the cables 30.

The source devices 10 (10-1 and 10-2 in FIG. 1) further include communication components 12 (12-1 and 12-2 in FIG. 1) (e.g., data transmitters) and controllers 13 (13-1 and 13-2 in FIG. 1), respectively. The communication components 12 will be discussed in detail below. The controllers 13 are control means for the overall control of the source devices 10.

The sink device 20 further includes an HDMI switch (SW) 22, a communication component 23 (e.g., a data receiver), a backlight (BL) driver 24, a backlight (BL) unit 25, and a controller 26. The HDMI SW 22 selects one of the signals inputted via the receptacle 21-1 and 21-2, and outputs this signal to the communication component 23. The communication component 23 will be discussed in detail below.

The BL driver 24 drives the light source of the BL unit 25 at a specific brightness based on a brightness control signal outputted by a backlight (BL) controller 261 of the controller 26 that will be discussed below. The BL unit 25 has LED (Light Emitting Diode) light sources of a plurality of colors that shine light from the rear face side of a liquid crystal panel (not shown) toward the liquid crystal panel. The BL unit 25 can be a conventional backlight device. Since the configuration of the conventional backlight device is well known in the art, the detailed configuration of the BL unit 25 will be omitted for the sake of brevity. The BL unit 25 can include other types of light sources, as needed and/or desired.

The controller 26 is a control means for the overall control of the sink device 20. The controller 26 includes the BL controller 261 and a determination component 262. The BL controller 261 controls the BL driver 24 by outputting the brightness control signal to the BL driver 24. The determination component 262 is a determination means for determining whether or not the signal (e.g., the AV signal) received by the communication component 23 includes a video signal, an audio signal, or a subtitle signal and for determining the frequency of the audio signal while the signal includes the audio signal. In this embodiment, as shown in FIG. 1, a single controller 26 is illustrated that includes the BL controller 261 and the determination component 262 in order to simplify the description. However, the configuration can instead be such that different controllers have the BL controller 261 and the determination component 262, respectively.

In the illustrated embodiment, the controllers 13 and 26 can include microcomputers with control programs that control the source devices 10 and the sink device 20, respectively. The controllers 13 and 26 each can also include other conventional components such as an input interface circuit, an output interface circuit, and storage devices such as a ROM (Read Only Memory) device and a RAM (Random Access Memory) device. The microcomputers of the controllers 13 and 26 are programmed to control the source devices 10 and the sink device 20, respectively. The storage devices store processing results and control programs that are run by the microcomputers. The internal RAM stores statuses of operational flags and various control data. The internal ROM stores the programs for various operations. It will be apparent to those skilled in the art from this disclosure that the precise structure and algorithms can be any combination of hardware and software that will carry out the functions of the present invention.

Figure 2:
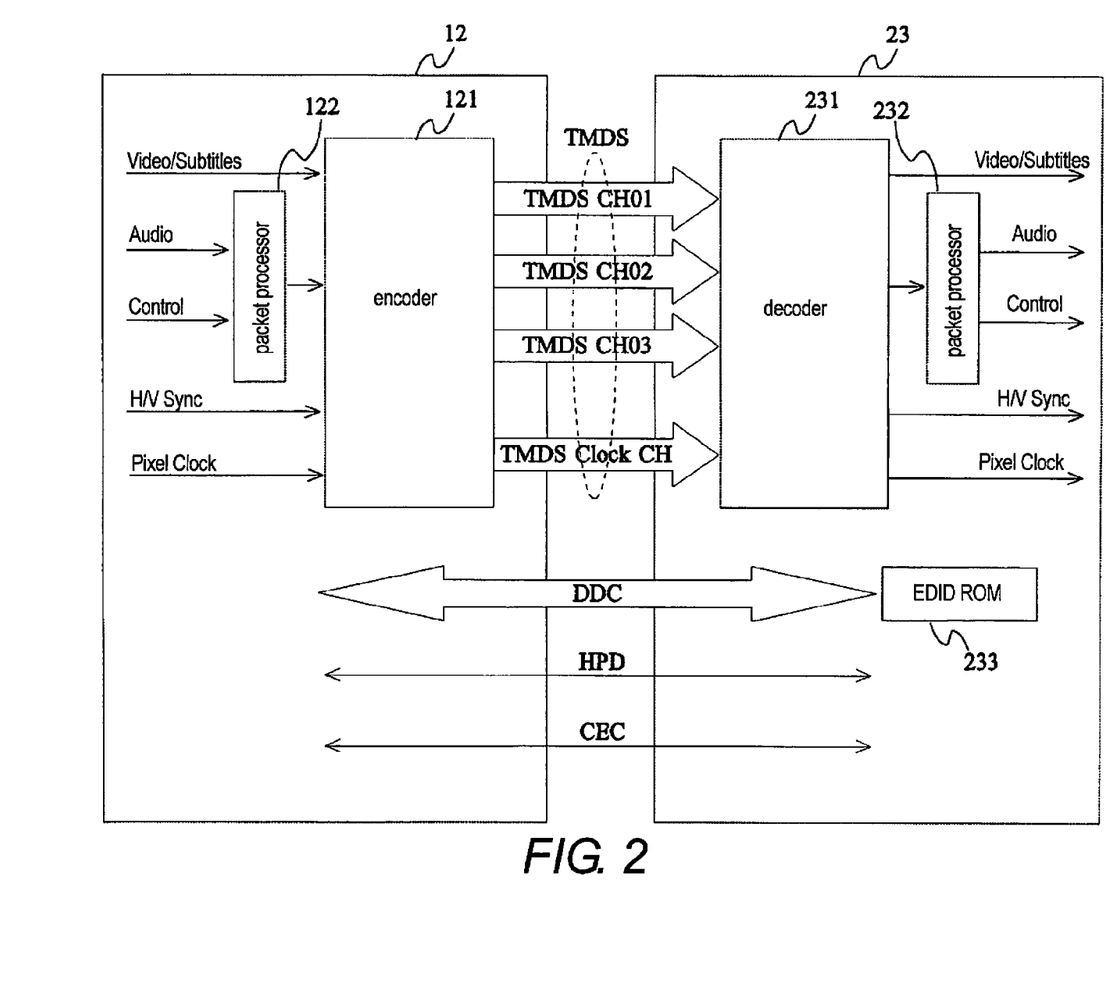
FIG. 2 illustrates a block diagram of a communication component (e.g., a data receiver) of a sink device (e.g., an AV device) and a communication component (e.g., a data transmitter) of a source device of the AV system illustrated in FIG. 1.

Next, the detailed configuration of the communication components 12 of the source devices 10 and the communication component 23 of the sink device 20 in the AV system 1 will be described through reference to FIG. 2. In FIG. 2, for the sake of simplicity, only one of the communication components 12 of the source devices 10 (10-1 and 10-2) is shown, and the illustration of the HDMI SW 22 is omitted for simplifying the description.

The HDMI standard, as discussed above, is a standard for transmitting the video signals, the subtitle signals, the audio signals, and the control signals on the TMDS channels. These TMDS channels will be described below.

As shown in FIG. 2, the communication components 12 each include an encoder 121 and a packet processor 122. Video data (e.g., video signals and subtitle signals), a horizontal/vertical (H/V) synchronization signal, and a pixel clock are inputted to the encoder 121. The encoder 121 converts uncompressed video signals and subtitle signals into corresponding differential signals, and serially transmits these to the communication component 23 of the sink device 20 via three TMDS channels (the TMDS CH01, TMDS CH02, and TMDS CH03 shown in FIG. 2). A TMDS clock synchronized to the video signals and the subtitle signals transmitted via the three channels is transmitted via a TMDS clock channel (TMDS Clock CH). In this embodiment, the TMDS CH01, the TMDS CH02, the TMDS CH03, and the TMDS clock channel will be collectively referred to as TMDS channels. The operation of the encoder 121 and the packet processor 122 are well known in the art. Thus, the detailed description of the operation will be omitted for the sake of brevity.

The audio signals and the control signals are made into a packet by the packet processor 122, converted into corresponding differential signals by the encoder 121, and serially transmitted through the three TMDS channels to the communication component 23 of the sink device 20.

As shown in FIG. 2, the communication component 23 includes a decoder 231, a packet processor 232, and an EDID ROM 233. The decoder 231 receives the differential signals corresponding to the video signals and the subtitle signals, and the differential signals corresponding to the audio signals and the control signals, via the three TMDS channels. This reception is synchronized with the TMDS clock transmitted via the TMDS clock channel. The audio signals and the control signals are decoded by the packet processor 232. The operation of the decoder 231 and the packet processor 232 are well known in the art. Thus, the detailed description of the operation will be omitted for the sake of brevity.

In addition to the above-mentioned TMDS channels, the transmission channels of the HDMI system include a DDC (display data channel) and a CEC (consumer electronics control) line. The DDC is formed of two signal lines (not shown) included in the cable 30, and is used by the communication component 12 to read E-EDID (enhanced extended display identification data) from the communication component 23. The E-EDID is display control information (such as the resolution or pixel), and various kinds of information are stored in the EDID ROM 233.

The communication components 12 is controlled by the controller 13 to read the E-EDID stored in the EDID ROM 233 from the communication component 23 via the DDC. The E-EDID read by the communication components 12 is inputted to the controller 13, and the controller 13 is able to recognize the frequency and resolution that can be displayed on the sink device 20, for example, based on the E-EDID.

The CEC line is formed of a single signal line (not shown) included in the cable 30, and is used for bidirectional communication of control data between the communication components 12 and the communication component 23. The cable 30 also includes a line connected to a pin called an HPD (hot plug detect), and the source device 10 can detect the connection of the sink device 20 via the HPD line.

Figure 3:
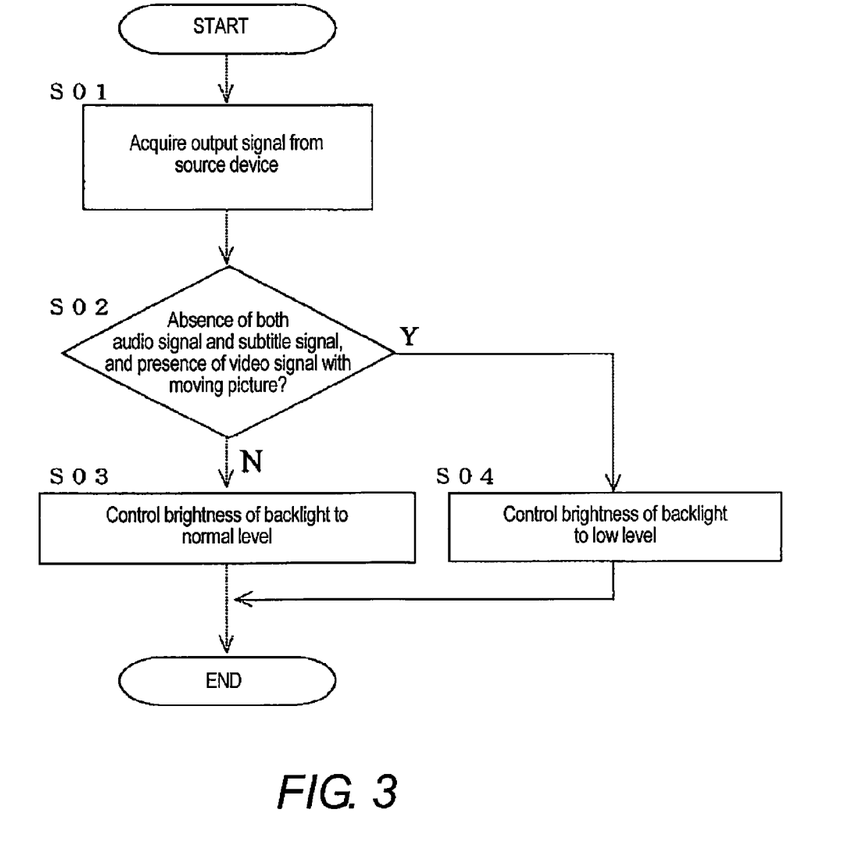
FIG. 3 is a flowchart of the processing executed by a controller of the sink device in accordance with the first embodiment.

The processing executed by the controller 26 of the sink device 20 (e.g., the AV device) in this embodiment will now be described through reference to FIG. 3. FIG. 3 is a flowchart of the processing executed by the controller 26 of the sink device 20.

In step S01, the controller 26 acquires the signal outputted from the communication component 12 via the communication component 23. In step S02, the determination component 262 of the controller 26 determines whether or not the signal acquired in step S01 includes an audio signal and a subtitle signal in addition to a video signal, and the video signal is a moving picture. If at least one of the audio signal and the subtitle signal is included or if the video signal is a still picture, not a moving picture (No in step S02), then the video signal is determined to be an ordinary video signal (e.g., a signal pertaining to video the user wants to watch). Thus, the BL controller 261 of the controller 26 controls or adjusts the brightness of the BL unit 25 via the BL driver 24 to the brightness used during normal operation (i.e., high brightness) (step S03).

On the other hand, if the audio signal and the subtitle signal are not both included and if the video signal is a moving picture (Yes in step S02), then the video signal is determined to be a signal pertaining to a screen saver. Thus, the BL controller 261 of the controller 26 controls or adjusts the brightness of the BL unit 25 via the BL driver 24 to be low (i.e., low brightness). For instance, the lit duration of the BL unit 25 is shortened and the brightness is set low by putting the duty ratio at its lowest value (step S04). In the illustrated embodiment, the brightness used during the normal operation (step S03) is higher than the brightness controlled to be low in step S04. The brightness used during the normal operation is a brightness used while the ordinary video is displayed.

With this embodiment, whether or not the video signal is the screen saver is determined precisely based on whether or not the output signal of the source device includes the audio signal and the subtitle signal in addition to the video signal, and the video signal is a moving picture. If the signal is the screen saver, the brightness of the backlight is controlled to be low, which reduces power consumption.

In the illustrated embodiment, alternatively or additionally, if the determination component 262 determines that the signal acquired in step S01 does not include both the audio signal and the subtitle signal in addition to the video signal and the video signal is a moving picture (Yes in step S02), then the determination component 262 can repeat the acquisition of step S01 and the determination of step S02 until a predetermined period, such as thirty seconds, one minute and the like, has elapsed. If the determination component 262 continue to determine that the signal acquired in step S01 does not include both the audio signal and the subtitle signal in addition to the video signal and the video signal is a moving picture (Yes in step S02) until the predetermined period has elapsed, then the BL controller 261 can adjust the brightness of the BL unit 25 via the BL driver 24 to be low.

Second Embodiment

Figure 4:
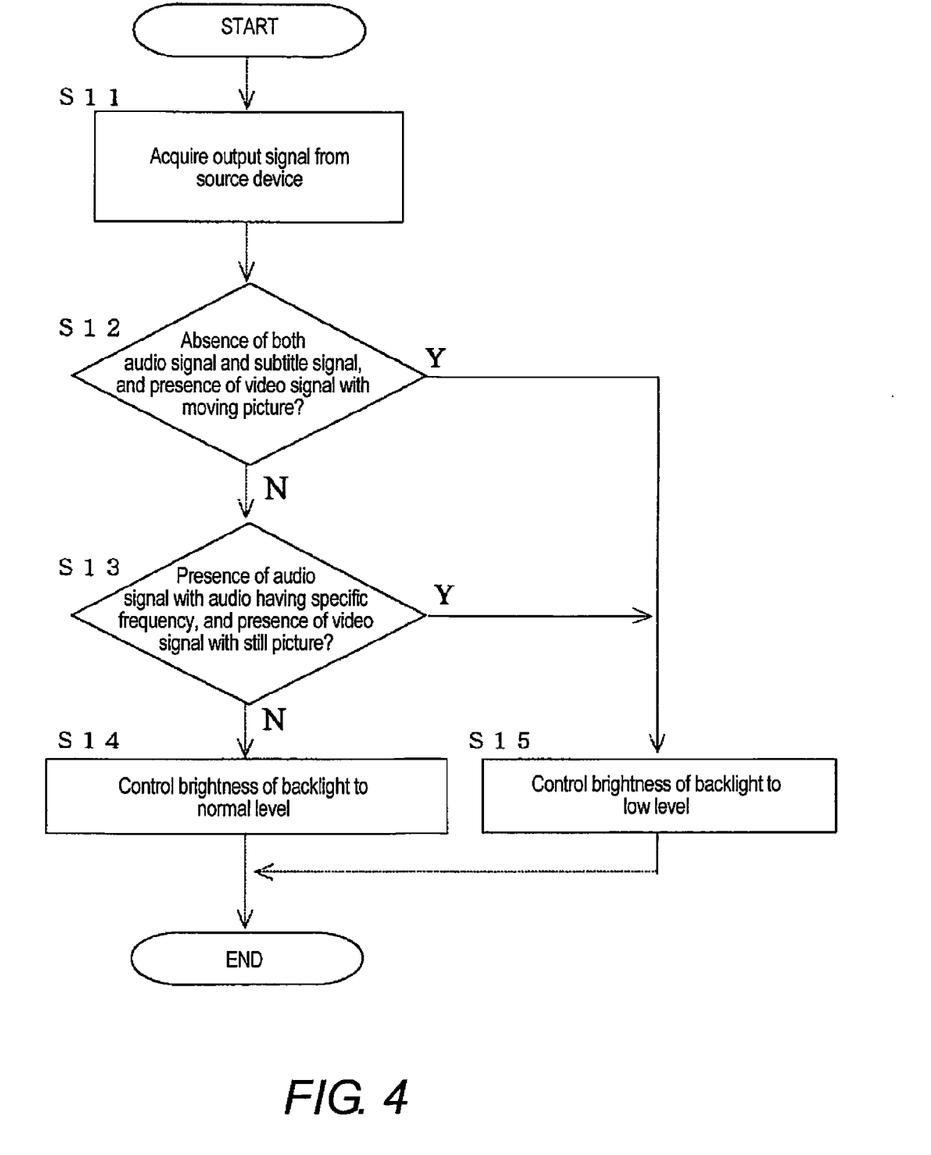
FIG. 4 is a flowchart of the processing executed by a controller of a sink device (e.g., an AV device) in accordance with a second embodiment.

Referring now to FIG. 4, a sink device 20 in accordance with a second embodiment will now be explained. In view of the similarity between the first and second embodiments, the parts of the second embodiment that are functionally similar to the parts of the first embodiment will be given the same reference numerals as the parts of the first embodiment. Moreover, the descriptions of the parts of the second embodiment that are functionally similar to the parts of the first embodiment may be omitted for the sake of brevity.

In the first embodiment, it is determined whether or not the video signal is a signal pertaining to the screen saver. However, in this embodiment, if the video signal is not a signal pertaining to the screen saver, then it is further determined whether or not it is a signal pertaining to a test pattern.

The processing executed by a controller 26 of the sink device 20 (e.g., the AV device) (see FIG. 1) in accordance with the second embodiment will be described through reference to FIG. 4. FIG. 4 is a flowchart of the processing executed by the controller 26 of the sink device 20. Steps S11, S12, S14, and S15 in FIG. 4 are the same as the steps S01, S02, S03, and S04 in FIG. 3, respectively, and therefore will not be described again.

In step S13, a determination component 262 of the controller 26 (see FIG. 1) determines whether or not the audio signal included in the output signal of a source device 10 (see FIG. 1) is a signal indicating audio having a specific frequency, and the video signal is a still picture. If the audio signal is a signal indicating audio having a non-specific frequency or if the video signal is a moving picture, not a still picture (No in step S13), then the video signal is determined to be an ordinary video signal, and the flow proceeds to step S14. On the other hand, if the audio signal is a signal indicating audio having the specific frequency and if the video signal is a still picture (Yes in step S13), then the video signal is determined to be a signal pertaining to the test pattern, and the flow proceeds to step S15. In the illustrated embodiment, the test pattern can be a reference image, such as color bars, and the specific frequency can be predetermined and set to the controller 26, as needed and/or desired. In particular, the specific frequency can be a single frequency used in the common reference tone of the test pattern, such as 1000 Hz. Of course, this frequency is merely an example, and can be a different frequency, as needed and/or desired. Also, the specific frequency can be a plurality of predetermined frequencies. Furthermore, the specific frequency can be a sequence of the predetermined frequencies, such as between 100 Hz and 10 kHz. In other words, the specific frequency can be any frequencies that is used as a reference tone. Furthermore, in the illustrated embodiment, the audio having the non-specific frequency means the audio having a frequency or a range of frequencies other than the predetermined frequency that has been predetermined as the specific frequency.

The same effect is obtained with this embodiment as with the first embodiment. In addition, whether or not the video signal is the test pattern can be determined precisely. If the signal is the test pattern, the brightness of the backlight is controlled to be low, which reduces power consumption.

In the illustrated embodiment, alternatively or additionally, whether or not the video signal is the test pattern can also be determined in step S13 by determining the level or volume change of the audio signal. For example, if the audio signal is a signal indicating audio having a constant level or volume (e.g., a constant sound pressure level), such as −20 dB or the volume used in the reference tone, and if the video signal is a still picture, for a predetermined period, then the the determination component 262 can determine that the video signal is a signal pertaining to the test pattern.

In the illustrated embodiment, alternatively or additionally, the determination component 262 can wait for the predetermined period in response to the determination result in step S12 being affirmative before the process proceeds to step S15 in the above-mentioned manner described in the first embodiment.

Similarly, if the determination component 262 determines that the audio signal is a signal indicating audio having the specific frequency and that the video signal is a still picture (Yes in step S13), then the determination component 262 can repeat the acquisition of step S11 and the determinations of steps S12 and S13 until a predetermined period, such as thirty seconds, one minute and the like, has elapsed. If the determination component 262 continue to determine that the signal acquired in step S11 includes at least one of the audio signal and the subtitle signal in addition to the video signal or the video signal is not a moving picture (No in step S12), and determine that the audio signal is a signal indicating audio having the specific frequency and the video signal is a still picture (Yes in step S13) until the predetermined period has elapsed, then a BL controller 261 of the controller 26 (see FIG. 1) can adjust the brightness of a BL unit 25 (see FIG. 1) via a BL driver 24 (see FIG. 1) to be low (step S15).

Third Embodiment

Figure 5:
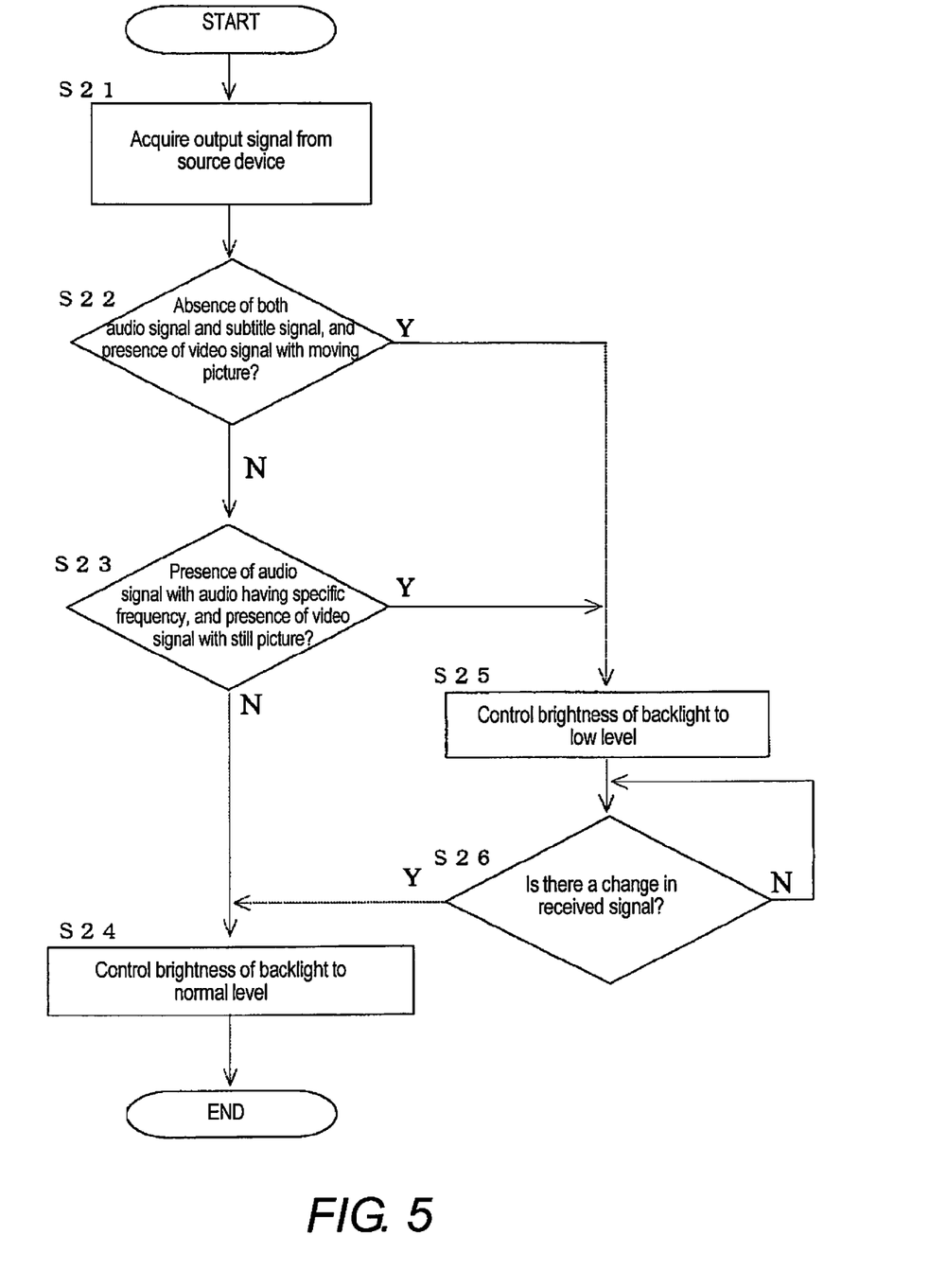
FIG. 5 is a flowchart of the processing executed by a controller of a sink device (e.g., an AV device) in accordance with a third embodiment.

Referring now to FIG. 5, a sink device 20 in accordance with a third embodiment will now be explained. In view of the similarity between the first to third embodiments, the parts of the third embodiment that are functionally similar to the parts of the first or second embodiment will be given the same reference numerals as the parts of the first or second embodiment. Moreover, the descriptions of the parts of the third embodiment that are functionally similar to the parts of the first or second embodiment may be omitted for the sake of brevity.

In this embodiment, processing is performed to control (return) the brightness of the BL unit 25, which has been controlled to be low in step S04 in the first embodiment and in step S15 in the second embodiment, to the brightness used in normal operation. This embodiment will be described as a modification example of the second embodiment. However, this embodiment can also be applied to the first embodiment.

The processing executed by a controller 26 of the sink device 20 (e.g., the AV device) (see FIG. 1) in accordance with the third embodiment will be described through reference to FIG. 5. FIG. 5 is a flowchart of the processing executed by the controller 26 of the sink device 20. Steps S21 to S25 in FIG. 5 are the same as the steps S11 to S15 in FIG. 4, respectively, and therefore will not be described again.

In step S26, a determination component 262 of the controller 26 (see FIG. 1) determines whether or not a differential (change) has occurred in the signal received by a communication component 23 (see FIG. 1) (i.e., the output signal of a source device 10 (see FIG. 1)). The differential in the signal received by the communication component 23 will be described below. If the video signal is a signal pertaining to a screen saver, then the video signal is included in the signal received by the communication component 23, and no audio signal or subtitle signal is included. Because the screen saver is a moving picture, the video signal will be a signal pertaining to the moving picture. Thus, the differential will occur in the signal received by the communication component 23 if the video signal is changed to be a signal pertaining to a still picture, or if the output signal is changed to include at least one of an audio signal and a subtitle signal.

If the video signal is a signal pertaining to a test pattern, then the signal received by the communication component 23 will include the video signal and the audio signal. Because the test pattern is a still picture, the video signal will be a signal pertaining to the still picture. Also, because the audio of the test pattern has the specific frequency, the audio signal will be a signal pertaining to the audio having the specific frequency. Thus, the differential (change) will occur in the signal received by the communication component 23 if the video signal is changed to be a signal pertaining to the moving picture, and if the audio signal is changed to be a signal pertaining to audio having the non-specific frequency.

If the above-described differential (change) occurs in the signal received by the communication component 23 (Yes in step S26), then the flow proceeds to step S24. On the other hand, if no differential (change) occurs in the signal received by the communication component 23 (No in step S26), then the processing of step S26 is repeated until a differential does occur in the signal received by the communication component 23.

The same effect is obtained with this embodiment as with the second embodiment. In addition, if the differential occurs in the signal received by the communication component, then the brightness of a BL unit 25 (see FIG. 1) is controlled or adjusted to be the brightness used in normal operation. That is, if the video changes from the screen saver or the test pattern to the ordinary video, then the brightness is set higher and increased without any user input, which makes the system more convenient.

In the illustrated embodiment, the occurrence of the differential or change can be determined in step S26 by detecting change in the video signal of the output signal from the moving picture to the still picture, by detecting change in the video signal of the output signal from the still picture to the moving picture, by detecting that the combination of the audio signal and the subtitle signal that is included in the output signal is changed, or by detecting the audio having the specific frequency is changed to the audio having the non-specific frequency.

In the illustrated embodiment, alternatively or additionally, the determination component 262 can wait for the predetermined period in response to the determination result in step S22 being affirmative before the process proceeds to step S25 in the above-mentioned manner described in the first embodiment.

Similarly, the determination component 262 can wait for the predetermined period in response to the determination result in step S23 being affirmative before the process proceeds to step S25 in the above-mentioned manner described in the second embodiment.

Fourth Embodiment

Figure 6:
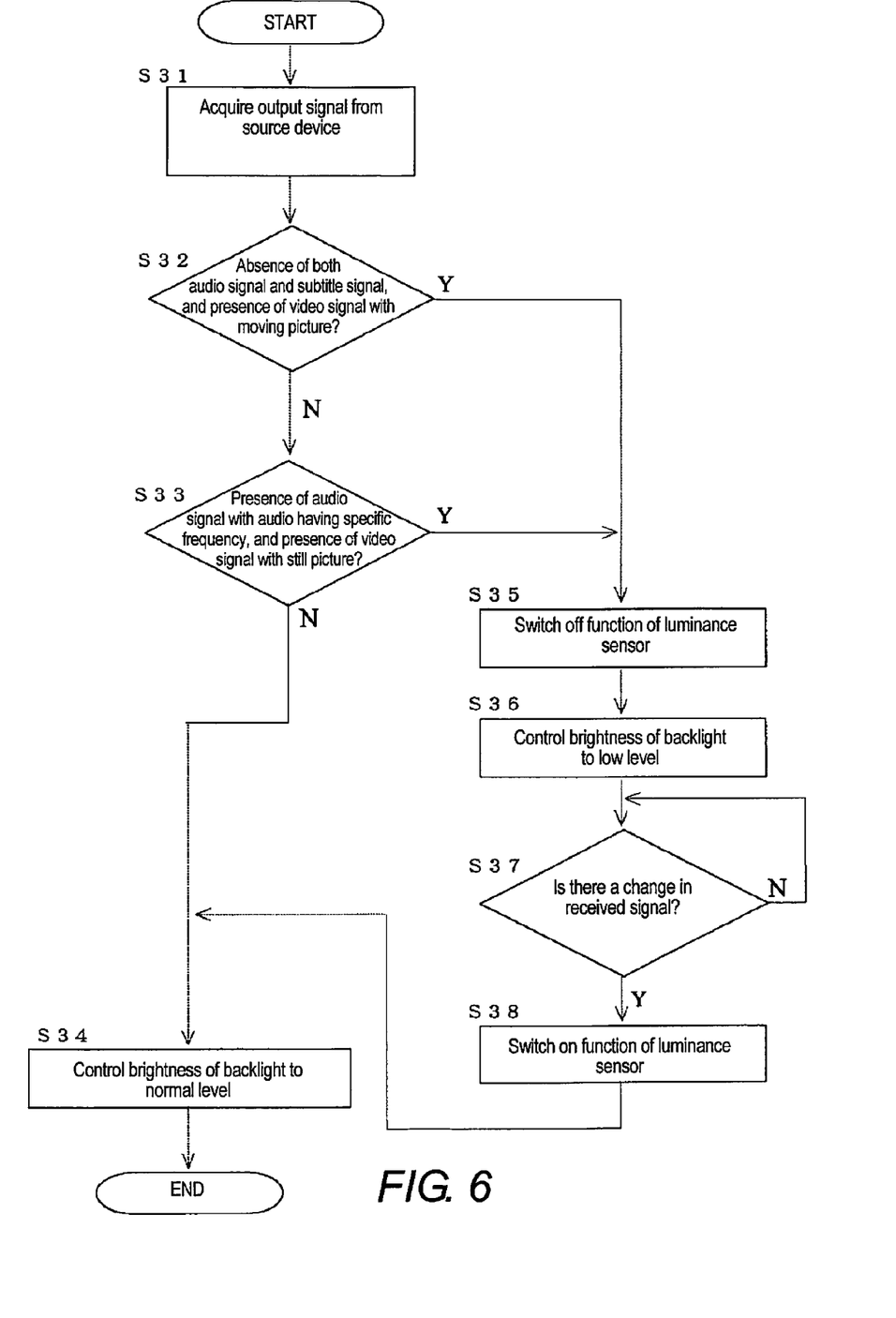
FIG. 6 is a flowchart of the processing executed by a controller of a sink device (e.g., an AV device) in accordance with a fourth embodiment.

Referring now to FIG. 6, a sink device 20 in accordance with a fourth embodiment will now be explained. In view of the similarity between the first to fourth embodiments, the parts of the fourth embodiment that are functionally similar to the parts of the first, second or third embodiment will be given the same reference numerals as the parts of the first, second or third embodiment. Moreover, the descriptions of the parts of the fourth embodiment that are functionally similar to the parts of the first, second or third embodiment may be omitted for the sake of brevity.

Depending on the model, the sink device 20 can be equipped with a luminance sensor (not shown) that produces a sensing signal by sensing the peripheral brightness where the sink device 20 is installed. A BL controller 261 of a controller 26 of the sink device 20 (see FIG. 1) controls the brightness of a BL unit 25 (see FIG. 1) to be low if the peripheral brightness is low (i.e., if it is dark) based on the sensing signal produced by the luminance sensor. On the other hand, if the peripheral brightness is high (i.e., if it is bright), then the brightness of the BL unit 25 is controlled to be high. Although not shown in FIG. 1, the luminance sensor is attached to the sink device 20 to sense the peripheral brightness of the sink device 20. The luminance sensor is electrically connected to the controller 26 to output the sensing signal to the controller 26 (or the BL controller 261). The BL controller 261 determines the peripheral brightness based on the sensing signal, and compares the peripheral brightness to a predetermined threshold to determine whether the peripheral brightness is low or high relative to the predetermined threshold.

However, as discussed above, if the video signal is a signal pertaining to a screen saver or a test pattern, then it is preferable to control the brightness of the BL unit 25 to be low regardless of the peripheral brightness. In view of this, in this embodiment, the controller 26 switches off the function of the luminance sensor when the video signal is a signal pertaining to the screen saver or the test pattern.

In this embodiment, the brightness of the BL unit 25 controlled in response to the sensing signal indicating that the peripheral brightness is low is higher than the brightness of the BL unit 25 controlled when the video signal is the signal pertaining to the screen saver or the test pattern.

The processing executed by the controller 26 of the sink device 20 (e.g., the AV device) (see FIG. 1) in accordance with the fourth embodiment will now be described through reference to FIG. 6. FIG. 6 is a flowchart of the processing executed by the controller 26 of the sink device 20. Steps S31 to S34, step S36 and step S37 in FIG. 6 are respectively the same as the steps S21 to S24, the step S25 and the step S26 in FIG. 5, and therefore will not be described again.

In step S35, the controller 26 switches off the function or operation of the luminance sensor in response to the determination result in step S32 being affirmative or the determination result in step S33 being affirmative. The brightness of the BL unit 25 is prevented from being reset to the high level due to the function of the luminance sensor by controlling the brightness of the BL unit 25 to be low (step S36) in a state in which the function of the luminance sensor has been switched off.

If the above-mentioned differential (change) occurs in the signal received by a communication component 23 (see FIG. 1) in step S37, then the controller 26 switches on the function of the luminance sensor in step S38. This controls the brightness of the BL unit 25 to the proper level according to the peripheral brightness (step S34).

The same effect is obtained with this embodiment as with the third embodiment. In addition, brightness adjustment based on the sensing signal from the luminance sensor can be stopped by switching off the function of the luminance sensor when the brightness of the BL unit 25 is to be kept low.

In the illustrated embodiment, alternatively or additionally, a determination component 262 (see FIG. 1) can wait for the predetermined period in response to the determination result in step S32 being affirmative before the process proceeds to step S35 in the above-mentioned manner described in the first embodiment.

Similarly, the determination component 262 can wait for the predetermined period in response to the determination result in step S33 being affirmative before the process proceeds to step S35 in the above-mentioned manner described in the second embodiment.

In the illustrated embodiments, the brightness used during the normal operation is a brightness used while the ordinary video is displayed. The ordinary video is a video except for the screen saver and the test pattern.

With the AV device in accordance with one aspect, the AV device includes a communication component, a determination component, and a controller. The communication component is configured to receive a signal outputted from a source device. The determination component is configured to determine whether or not the signal received by the communication component includes an audio signal and a subtitle signal, and a video signal included in the signal received by the communication component has a moving picture. The controller is configured to control a brightness of a backlight to be low in response to determining that the signal received by the communication component does not include the audio signal and the subtitle signal, and that the video signal has the moving picture.

With the AV device, the determination component can be further configured to determine whether or not the audio signal includes audio having a specific frequency while the signal received by the communication component includes the audio signal, and the controller can be further configured to control the brightness of the backlight to be low in response to determining that the audio signal includes the audio having the specific frequency.

With the AV device, the controller can be further configured to detect a change in the signal received by the communication component while the brightness of the backlight is controlled to be low, and the controller can be further configured to control the brightness of the backlight to a brightness used during normal operation in response to detecting the change in the signal received by the communication component.

With the AV device, the change in the signal received by the communication component includes a change caused by changing the video signal included in the signal received by the communication component from the moving picture to a still picture, or from the still picture to the moving picture.

With the AV device, the change in the signal received by the communication component includes a change caused by including the audio signal that has not been included in the signal received by the communication component.

With the AV device, the change in the signal received by the communication component includes a change caused by changing a frequency of the audio signal included in the signal received by the communication component from a specific frequency to a non-specific frequency.

With the AV device, the AV device can further include a luminance sensor configured to sense a peripheral brightness to output a sensing signal. With the AV device, the controller can be further configured to switches off a function of the luminance sensor while the brightness of the backlight is controlled to be low.

With the present invention, when the output signal of the source device does not include the audio signal and the subtitle signal, and the video signal has a moving picture, the brightness of the backlight is controlled to be low. Since this output signal can include the video signal pertaining to a screen saver when the output signal does not include the audio signal and the subtitle signal, and the video signal has a moving picture, power consumption is suppressed by controlling the brightness of the backlight to be low.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated. Also, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An AV device comprising:
a communication component configured to receive a digital signal outputted from a source device;
a determination component configured to determine whether or not the digital signal received by the communication component includes an audio data and a subtitle data, and a video data included in the digital signal received by the communication component has a moving picture; and
a controller configured to control a brightness of a backlight to be low in response to determining that the digital signal received by the communication component does not include both the audio data and the subtitle data, and that the video data has the moving picture.

2. The AV device according to claim 1, wherein
the determination component is further configured to determine whether or not the audio data includes audio having a specific frequency while the digital signal received by the communication component includes the audio data, and
the controller is further configured to control the brightness of the backlight to be low in response to determining that the audio data includes the audio having the specific frequency.

3. The AV device according to claim 1, wherein
the controller is further configured to detect a change in the digital signal received by the communication component while the brightness of the backlight is controlled to be low, and
the controller is further configured to control the brightness of the backlight to a brightness used during normal operation in response to detecting the change in the digital signal received by the communication component.

4. The AV device according to claim 3, wherein
the change in the digital signal received by the communication component includes a change caused by changing the video data included in the digital signal received by the communication component from the moving picture to a still picture, or from the still picture to the moving picture.

5. The AV device according to claim 3, wherein
the change in the digital signal received by the communication component includes a change caused by including the audio data that has not been included in the digital signal received by the communication component.

6. The AV device according to claim 3, wherein
the change in the digital signal received by the communication component includes a change caused by changing a frequency of audio corresponding to the audio data included in the digital signal received by the communication component from a specific frequency to a non-specific frequency.

7. The AV device according to claim 1, further comprising
a luminance sensor configured to sense a peripheral brightness to output a sensing signal,
the controller being further configured to switch off a function of the luminance sensor while the brightness of the backlight is controlled to be low.

8. The AV device according to claim 2, wherein
the controller is further configured to detect a change in the digital signal received by the communication component while the brightness of the backlight is controlled to be low, and
the controller is further configured to control the brightness of the backlight to a brightness used during normal operation in response to detecting the change in the digital signal received by the communication component.

9. The AV device according to claim 3, wherein
the change in the digital signal received by the communication component includes a change caused by changing the video data included in the digital signal received by the communication component from the moving picture to a still picture, or from the still picture to the moving picture, a change caused by including the audio data that has not been included in the digital signal received by the communication component, and a change caused by changing a frequency of audio corresponding to the audio data included in the digital signal received by the communication component from a specific frequency to a non-specific frequency.

10. The AV device according to claim 3, wherein
the controller is further configured to increase the brightness of the backlight in response to detecting the change in the digital signal received by the communication component.

* * * * *